U. S. ANDES.
BAKING OVEN.
APPLICATION FILED MAR. 13, 1912.
1,046,368.
Patented Dec. 3, 1912.
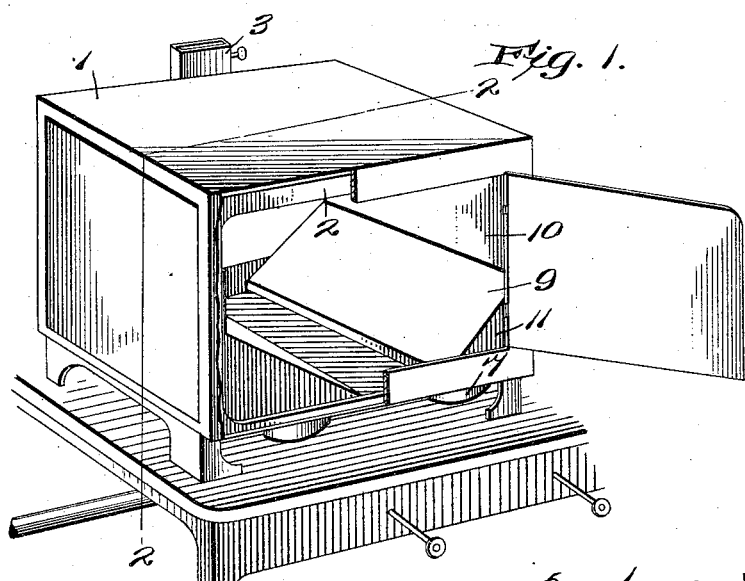
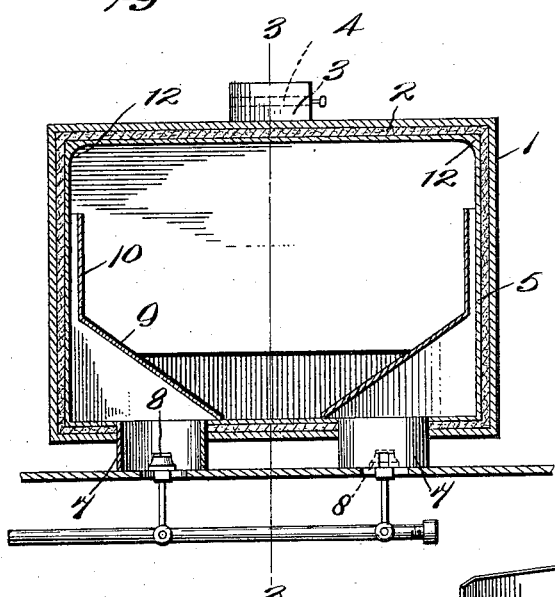
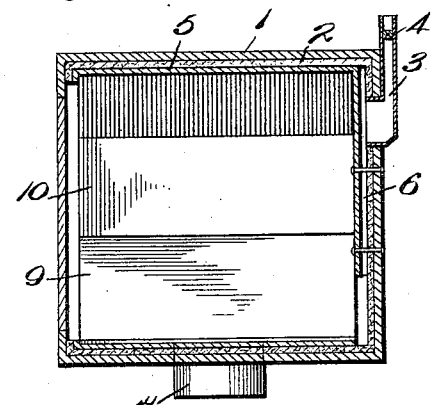
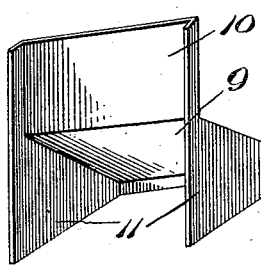
Witnesses
Edwin J. Beller
H. W. Primm
Inventor
Ulysses S. Andes
by Wilkinson, Fisher
& Witherspoon
Attorneys

UNITED STATES PATENT OFFICE.

ULYSSES SEVIER ANDES, OF MANILA, PHILIPPINE ISLANDS.

BAKING-OVEN.

1,046,368.   Specification of Letters Patent.   Patented Dec. 3, 1912.

Application filed March 13, 1912. Serial No. 683,571.

*To all whom it may concern:*

Be it known that I, ULYSSES SEVIER ANDES, a citizen of the United States, residing at Manila, Philippine Islands, have invented certain new and useful Improvements in Baking-Ovens; and I do hereby declare the following to be a full, clear, and exact description of the invention, such as will enable others skilled in the art to which it appertains to make and use the same.

My invention relates to improvements in baking ovens, and it consists in the constructions, combinations and arrangements herein described and claimed.

The object of my invention is to provide an improved oven in which the heating gases will be efficiently distributed through the interior of the oven to insure a high and uniform temperature in all parts thereof.

In the accompanying drawings forming a part of this application, and in which similar reference symbols indicate corresponding parts in the several views:—Figure 1 is a perspective view, partly broken away, illustrating one embodiment of my invention; Fig. 2 is a section on the line 2—2 of Fig. 1; Fig. 3 is a section on the line 3—3 of Fig. 2; and Fig. 4 is a perspective view of one of the interior side flue members.

Referring to the drawings, 1 indicates an outer oven casing of sheet metal or other suitable material, provided with a lining of heat non-conducting material 2, such as asbestos, and having in its rear wall an exit flue 3 for the heating gases provided with a damper 4. An inner casing 5 is spaced from the rear oven wall to provide a passage 6 leading from the lower portion of the oven to said exit flue 3. Entrance flues 7 for the heating gases extend through the bottom of said oven, and are adapted to be spaced around the usual type of stove burners 8 for permitting the passage of an excess of air with the heating gases.

Partitions comprising inclined portions 9 and upright portions 10 are provided with continuous lateral flanges 11 for engaging the bottom and side walls of the inner casing 5, to provide inner flues for deflecting the heating gases against the side oven walls and directing such gases into the upper portion of the oven.

From the above description, it will be understood that my invention provides a simple and efficient construction, in which the heating gases will be directed into the upper side portions of the oven and deflected by the curved oven wall 12 to the center of the oven, where they are gradually forced downwardly and drawn from the lower portion of the oven through the passage 6 communicating with the exit flue 3; the damper 4 providing a convenient means for regulating the flow of the heating gases.

I have illustrated and described preferred and satisfactory constructions, but changes could be made within the spirit and scope of my invention.

I claim:—

An oven comprising an outer casing provided with an upper exit flue, an inner casing spaced from the rear wall of said outer casing to provide an inner passage communicating with such flue, said inner casing being provided with an opening to such inner passage, bottom entrance flues for the heating gases extending through said inner and outer casings, in combination with partitions comprising inclined portions and upright portions provided with lateral flanges for engaging the interior bottom and side walls of the oven to provide inner passages for deflecting the heating gases against the side oven walls and directing such gases into the upper portion of the oven.

In testimony whereof, I hereby affix my signature, in presence of two witnesses.

ULYSSES SEVIER ANDES.

Witnesses:
C. GOMEZ SLAMO,
AGUSTIN FARAL.

Copies of this patent may be obtained for five cents each, by addressing the "Commissioner of Patents, Washington, D. C."